United States Patent
Subramanian et al.

(10) Patent No.: US 11,573,722 B2
(45) Date of Patent: Feb. 7, 2023

(54) TENANT BASED ALLOCATION FOR POOLED MEMORY

(71) Applicant: Intel Corporation, Santa Clara, CA (US)

(72) Inventors: Rasika Subramanian, Hillsboro, OR (US); Lidia Warnes, Roseville, CA (US); Francesc Guim Bernat, Barcelona (ES); Mark A. Schmisseur, Phoenix, AZ (US); Durgesh Srivastava, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/987,057

(22) Filed: Aug. 6, 2020

(65) Prior Publication Data

US 2020/0363975 A1 Nov. 19, 2020

(51) Int. Cl.
*G06F 3/06* (2006.01)

(52) U.S. Cl.
CPC .......... *G06F 3/0644* (2013.01); *G06F 3/0604* (2013.01); *G06F 3/0673* (2013.01)

(58) Field of Classification Search
CPC ..... G06F 3/0673; G06F 3/0604; G06F 3/0644
See application file for complete search history.

(56) References Cited

U.S. PATENT DOCUMENTS

| | | | |
|---|---|---|---|
| 2015/0293881 A1* | 10/2015 | Raikin | G06F 12/1072 709/212 |
| 2016/0239430 A1* | 8/2016 | Tsirkin | G06F 12/109 |
| 2019/0171473 A1* | 6/2019 | Hildenbrand | G06F 9/45558 |
| 2020/0285588 A1* | 9/2020 | Quinn | G06F 9/541 |
| 2021/0132999 A1* | 5/2021 | Haywood | G06F 9/5077 |

* cited by examiner

*Primary Examiner* — Edward J Dudek, Jr.
(74) *Attorney, Agent, or Firm* — Essential Patents Group, LLP.

(57) ABSTRACT

An embodiment of an electronic apparatus may include one or more substrates, and logic coupled to the one or more substrates, the logic to provide an interface to a pooled memory that is configured as a combination of local memory and remote memory, wherein the remote memory is shared between multiple compute nodes, allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory. Other embodiments are disclosed and claimed.

18 Claims, 12 Drawing Sheets

TENANT BASED ALLOCATION FOR POOLED MEMORY

BACKGROUND

Memory pooling may refer to memory management technology for sharing memory among applications or compute nodes. Multi-tier memory management technology may organize memory into two or more tiers according to various storage or performance characteristics associated with the memory, such as capacity, bandwidth, latency, etc. Memory ballooning may refer to memory management technology where memory allocated to one virtual machine may be enlarged by reclaiming memory previously allocated to other virtual machines and/or unallocated/unutilized memory.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
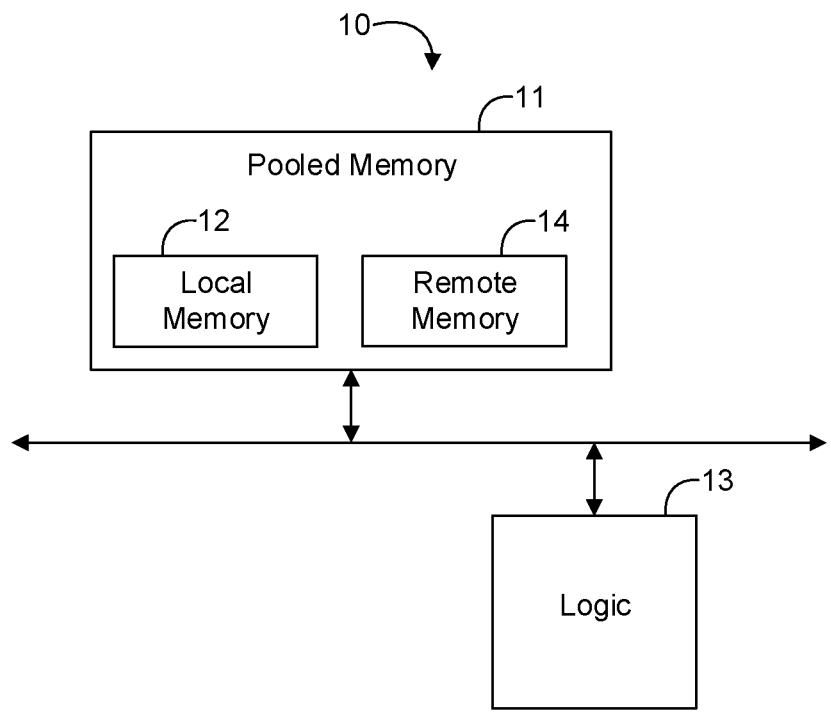
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

As noted above, and without being limited to particular implementations, some examples of memory ballooning may refer to memory management technology where memory allocated to one virtual machine may be enlarged by reclaiming memory previously allocated to other virtual machines and/or unallocated/unutilized memory. Without being limited to particular implementations, some examples of a tenant may refer to a client of a server or a datacenter. The client may correspond to a particular customer and some or all applications of that customer that may run on the server/datacenter including, for example, virtualization applications. Alternatively, or additionally, the client may correspond to a particular application or software agent that may run on the server/datacenter including, for example, a virtualization application or agent.

With reference to FIG. 1, an embodiment of an electronic system 10 may include a pooled memory 11 configured as a combination of local memory 12 and remote memory 14 (e.g., where the remote memory 14 is shared between multiple compute nodes), and logic 13 communicatively coupled to the pooled memory 11. The logic 13 may be configured to provide an interface to the pooled memory 11, allocate respective memory portions of the pooled memory 11 to respective tenants, associate respective memory balloons with the respective tenants that correspond to the allocated respective memory portions, and manage the respective memory balloons based on the respective tenants and two or more memory tiers associated with the pooled memory 11. In some embodiments, the logic 13 may be further configured to provide memory affinity for two or more applications associated with a particular tenant of the respective tenants. For example, the logic 13 may be configured to share a particular memory balloon of the respective memory balloons associated with a particular tenant of the respective tenants among two or more applications associated with the particular tenant.

In some embodiments, the logic 13 may be configured to manage the respective memory balloons based on a first table that indicates a tenant memory allocation and a second table that indicates a node to tier distance (e.g., as described in further detail herein). Additionally, or alternatively, the logic 13 may be configured to determine if a first memory balloon of the respective memory balloons associated with a first tenant of the respective tenants has no free pages, and, if so determined, request free pages from a second balloon of the respective memory balloons associated with a second tenant of the respective tenants. In some embodiments, the logic 13 may be further configured to allocate a particular memory balloon of the respective memory balloons associated with a particular tenant of the respective tenants to a particular memory tier of the two or more memory tiers based on a performance characteristic associated with the particular tenant. For example, the performance characteristic may correspond to one or more of a service level agreement (SLA) characteristic, a service level objective (SLO) characteristic, and a quality of service (QoS) characteristic.

Embodiments of each of the above pooled memory 11, local memory 12, logic 13, remote memory 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. In some embodiments, the local memory 12, the logic 13, and/or other system memory may be located in, or co-located with, various components, including a processor (e.g., on a same die). Embodiments of a processor may include a general purpose processor, a special purpose processor, a central processor unit (CPU), an execution unit, a general purpose controller, a special purpose controller, a memory controller, a storage controller, a micro-controller, an execution unit, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the local memory 12, persistent storage media, or other system memory may store a set of instructions which when executed by a processor cause the system 10 to implement one or more components, features, or aspects of the system 10 (e.g., the logic 13, providing the interface to the pooled memory 11, allocating respective memory portions of the pooled memory 11 to respective tenants, associating respective memory balloons with the respective tenants, managing the respective memory balloons based on the respective tenants and two or more memory tiers associated with the pooled memory 11, etc.).

Figure 2:
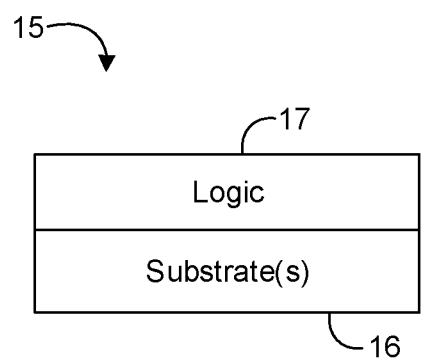
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to may be configured to provide an interface to a pooled memory that is configured as a combination of local memory and remote memory (e.g., where the remote memory is shared between multiple compute nodes), allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory. In some embodiments, the logic 17 may be further configured to provide memory affinity for two or more applications associated with a particular tenant of the respective tenants. For example, the logic 17 may be configured to share a particular memory balloon of the respective memory balloons associated with a particular tenant of the respective tenants among two or more applications associated with the particular tenant.

In some embodiments, the logic 17 may be configured to manage the respective memory balloons based on a first table that indicates a tenant memory allocation and a second table that indicates a node to tier distance (e.g., as described in further detail herein). Additionally, or alternatively, the logic 17 may be configured to determine if a first memory balloon of the respective memory balloons associated with a first tenant of the respective tenants has no free pages, and, if so determined, request free pages from a second balloon of the respective memory balloons associated with a second tenant of the respective tenants. In some embodiments, the logic 17 may be further configured to allocate a particular memory balloon of the respective memory balloons associated with a particular tenant of the respective tenants to a particular memory tier of the two or more memory tiers based on a performance characteristic associated with the particular tenant. For example, the performance characteristic may correspond to one or more of a SLA characteristic, a SLO characteristic, and a QoS characteristic.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
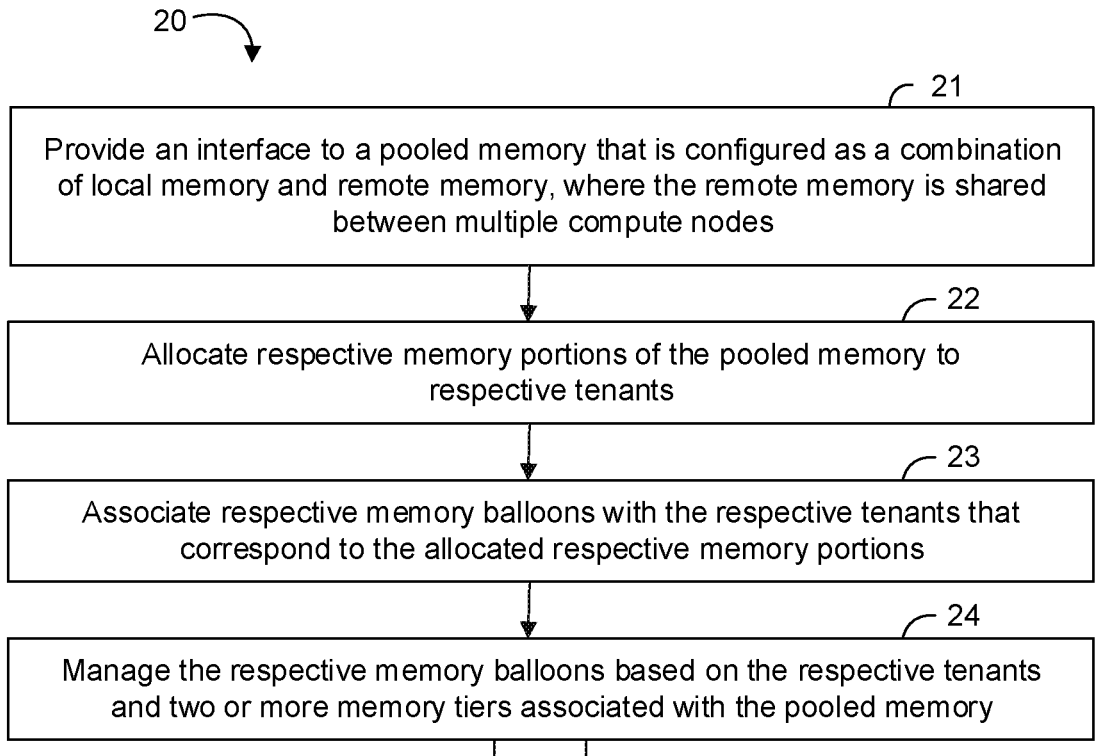
FIGS. 3A to 3C are flowcharts of an example of a method of managing memory according to an embodiment.
Figure 3B:
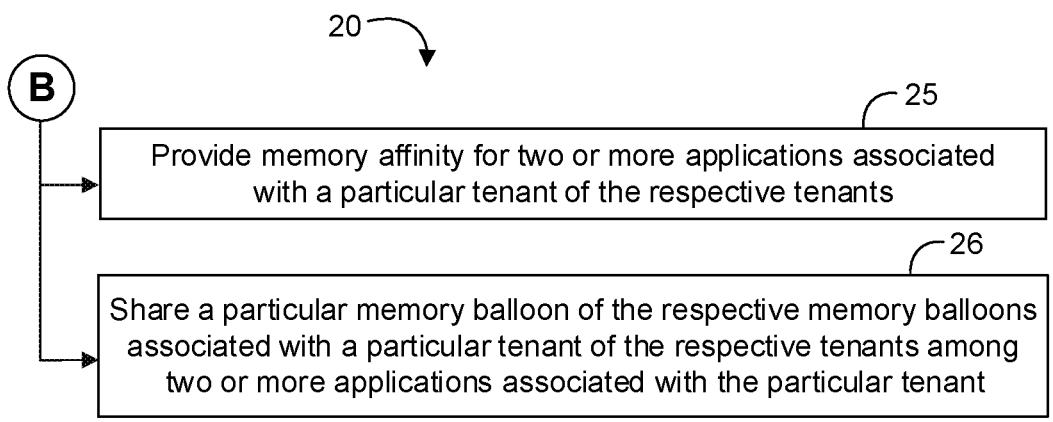
Figure 3C:
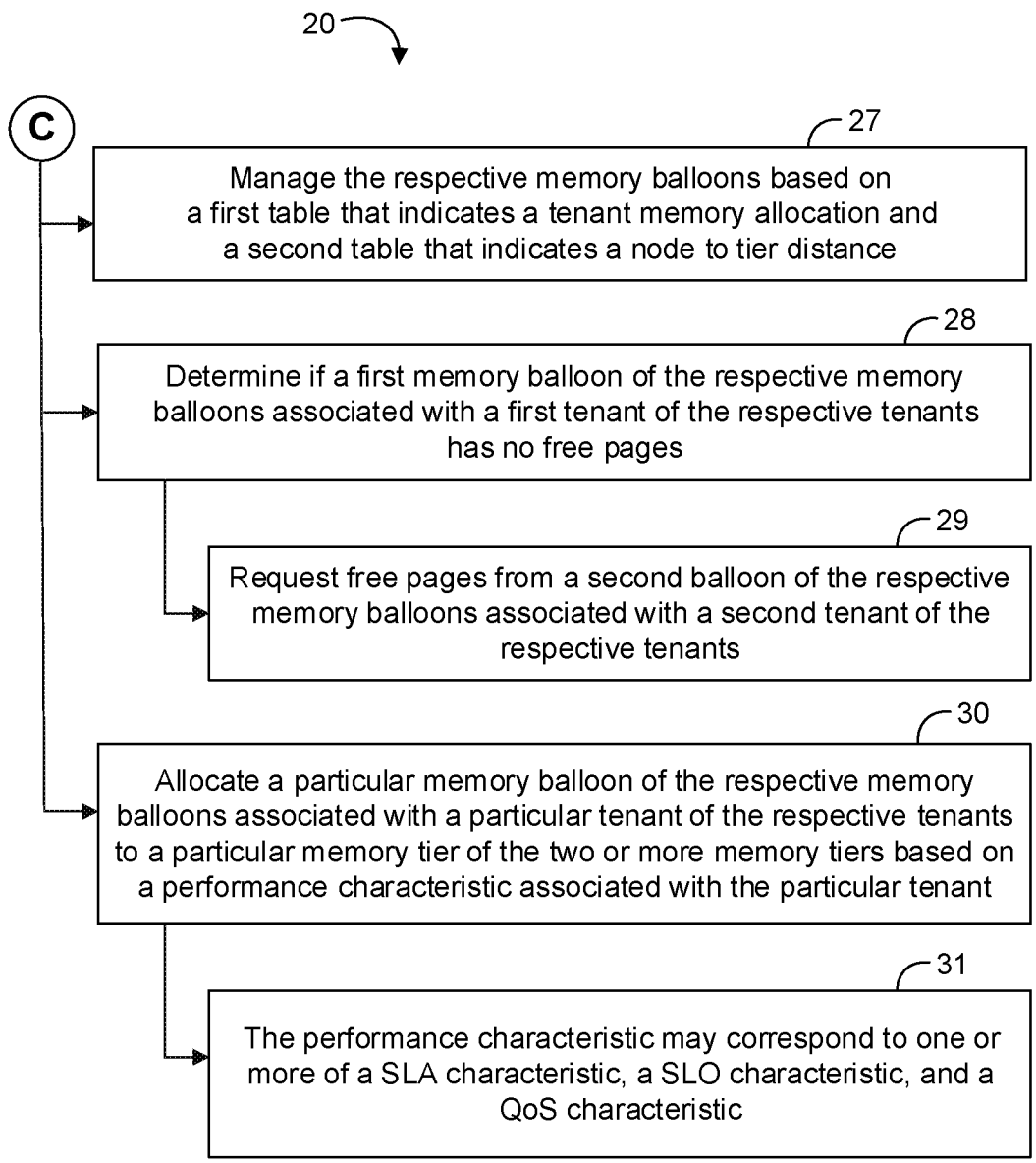

Turning now to FIGS. 3A to 3C, an embodiment of a method 20 of managing memory may include providing an interface to a pooled memory that is configured as a combination of local memory and remote memory at block 21 (e.g., where the remote memory is shared between multiple compute nodes), allocating respective memory portions of the pooled memory to respective tenants at block 22, associating respective memory balloons with the respective tenants that correspond to the allocated respective memory portions at block 23, and managing the respective memory balloons based on the respective tenants and two or more memory tiers associated with the pooled memory at block 24. Some embodiments of the method 20 may further include providing memory affinity for two or more applications associated with a particular tenant of the respective tenants at block 25, and/or sharing a particular memory balloon of the respective memory balloons associated with a particular tenant of the respective tenants among two or more applications associated with the particular tenant at block 26.

In some embodiments, the method 20 may further include managing the respective memory balloons based on a first table that indicates a tenant memory allocation and a second table that indicates a node to tier distance at block 27. The method 20 may additionally, or alternatively, include determining if a first memory balloon of the respective memory balloons associated with a first tenant of the respective tenants has no free pages at block 28, and, if so determined, requesting free pages from a second balloon of the respective memory balloons associated with a second tenant of the respective tenants at block 29. Some embodiments of the method 20 may also include allocating a particular memory balloon of the respective memory balloons associated with a particular tenant of the respective tenants to a particular memory tier of the two or more memory tiers based on a performance characteristic associated with the particular tenant at block 30. For example, the performance characteristic may correspond to one or more of a SLA characteristic, a SLO characteristic, and a QoS characteristic at block 31.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for tenant conscious optimized memory allocation in pooled architectures. Main memory in servers and data centers present various problems such as, for example, overprovisioning and underutilization. Conventional pooled memory technology and tiered memory technologies are directed at some of the foregoing problems, but may still have problems related to tenant based issues. Some embodiments may advantageously overcome one or more tenant based problems with pooled and/or tiered memory technology. Specifically, some embodiments may provide improvements related to tenant affinity (e.g., memory tiering based on cost and SLA/SLO expectations, shared memory across tenant virtual machines (VMs), etc.), tenant-based memory stranding, total cost of ownership (TCO), and/or maintaining SLAs/SLOs. Some embodiments may advantageously provide tenant conscious memory balloon technology for pooled/tiered memory to improve resource utilization for a multi-tenancy environment (e.g., including virtualized environments).

Some embodiments may improve or optimize memory utilization by incorporating better allocation to a combination of local and remote memory where the remote memory is shared between multiple compute nodes. Some embodiments may be implemented in a hardware compute device, which in some implementations may be referred to as a pool tiering gateway (PTG) device. Some embodiments may provide hardware assisted technology to synchronize memory automatically between different VMs of the same tenant, which may improve the VMs' performance Some embodiments of a PTG may expand the pooled memory architecture to allow balloon drivers the capability of tenant memory allocation across multiple platforms, which may allow all the VMs of the tenant to expand onto the same memory tier of remote memory such that the tenant may advantageously maintain its SLA/SLO requirements and/or improve its performance.

Some embodiments may provide a hardware implementation improve the abilities of the balloon driver in the hypervisor and VM by, for example, providing tenant VM memory affinity in data centers (e.g., which may include implementation of tenant QoS policies and/or SLA/SLO at the memory ballooning level). Some embodiments may also help with a wide variation of memory usage with applications. For example, some embodiments may facilitate memory balloons hosted in pooled memory that can be shared across multiple VMs of the same tenant across different servers. Some embodiments may also facilitate memory balloons hosted in pooled memory that can be coordinated across multiple tenants and across different servers.

Memory tiering has the potential of reducing the datacenter TCO and of solving a number of memory upgrade problems by decoupling the compute technology from the memory technology life cycle. However, just using the memory pool as overflow banks may result in poor memory utilization negating the potential cost advantages associated with tiering. Some embodiments advantageously provide technology to better utilize local and remote memory simultaneously and also to provide a platform for tenant VM memory affinity in data centers. For example, some embodiments provide technology for multi-VM/multi-node pooled memory balloon sharing and/or multi-tiered QoS and SLA/SLO pooled memory aware policies. In some embodiments, a balloon driver may be configured to support multi-node, multi-tiers, and multi-tenant memory pooled architectures. Embodiments of tenant conscious memory ballooning technology may advantageously provide better security (e.g., because the memory is used by the same tenant), and/or may reduce the latency of memory allocation from the pool (e.g., because pages don't have to be cleared before reallocating memory).

Figure 4:
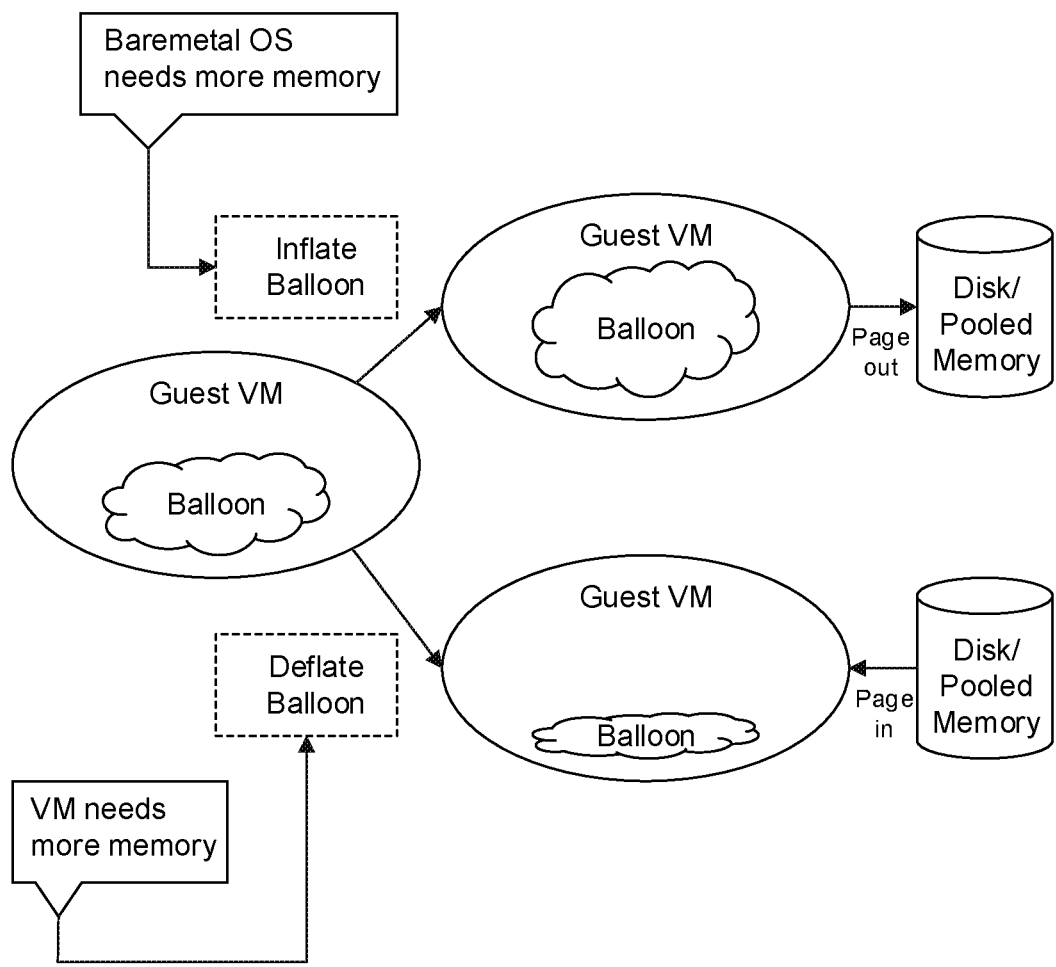
FIG. 4 is a block diagram of an example of a virtualization environment according to an embodiment.

With reference to FIG. 4, an embodiment of a virtualization environment 35 may include a Guest VM with an associated balloon. When the Guest VM is initialized (e.g., or instantiated), the balloon associated with the Guest VM may be partially inflated. If the baremetal OS (e.g., or host OS) needs more memory, the balloon associated with the Guest VM may be inflated (e.g., if the Guest VM has low memory utilization). If the Guest VM needs more memory, the balloon associated with the Guest VM may be deflated. In the case where there are not enough unused physical memory resources relative to the baremetal OS or VM demand, page swaps to storage (e.g., disk and/or pooled memory) may be initiated.

In some environments, a balloon driver may be installed in each guest OS/VM. All of the Guest VMs may be aware of the balloon driver and there may be a mutual agreement between the VM and the hypervisor to provide the balloon driver access to all memory pages of the VM. In general, memory ballooning works based on an assumption that not all the VMs are going to need to use all of their balloon memory capacity at the same time. By monitoring the excess memory in each VM, the hypervisor may satisfy periodic higher memory demands by inflating the balloon of the VMs with low memory utilization (e.g., which blocks those VMs from using the memory capacity in the inflated balloon), reclaiming the memory, and re-allocating the reclaimed memory to the VMs with high memory demand After a VM completes its high memory demand operation, the balloon associated with the balloon may be inflated to free those memory pages. The balloon driver may then make the hypervisor aware that the pages are free. In the case where there are not enough unused physical memory resources relative to the VM demand, page swaps to storage may be initiated.

Some embodiments may initially provide only a percentage of memory to the VM (e.g., less than 100%) and only provide more when needed, which not only reduces the initial memory utilization, leading to more local memory for newer VMs to be spun up on the machine, but also helps with a more optimized approach of utilizing pooled memory. Some embodiments may further improve pooled memory management technology with tenant conscious ballooning technology and/or cross tenant pooled balloon management technology.

Tenant Conscious Ballooning Examples

Figure 5:
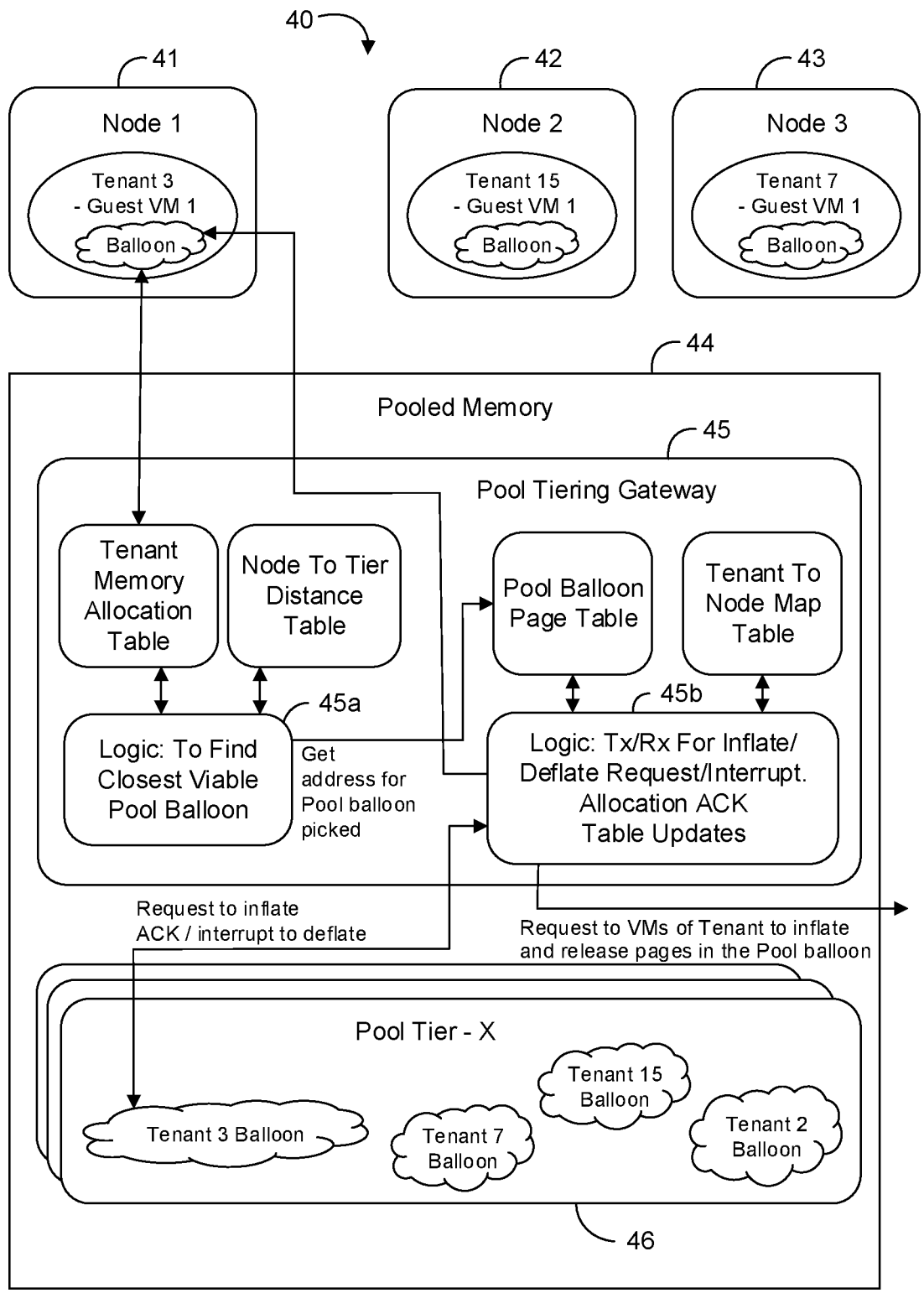
FIG. 5 is a block diagram of an example of a distributed compute environment according to an embodiment.

With reference to FIG. 5, a distributed compute environment 40 may include multiple compute nodes 41, 42, and 43 (Node 1, Node 2, and Node 3, respectively) communicatively coupled to a pooled memory 44. The pooled memory 44 may include a PTG 45 which manages access to multiple pool tiers 46. Expanding ballooning technology utilizing memory pools with tenant conscious ballooning technology may provide improvements or optimizations to address one or more problems including, for example, TCO and SLA/SLO, tenant affinity, and/or tenant memory stranding.

In this example, multiple VMs may be launched by a tenant across a data center. At this scale, a hardware PTG 45 may be preferred to allocate the pooled memory 44 for ballooning. As illustrated, the hardware PTG 45 may be located within the pooled memory 44. In this example, all requests for balloon expansion and deflation may be handled by the PTG 45. The pooled memory 44 may include its own management technology to handle the nodes to pool mapping. For purposes of explanation, the following description goes into further detail with respect to a first case where a guest VM of a tenant located within a node needs more memory and a second case where a host OS/baremetal OS needs more memory.

In an example first case, with reference to FIG. 5, a Guest VM 1 of Tenant 3 located on Node 1 needs more memory. When VM 1 asks for more memory, the balloon driver within the VM sends a request to the PTG 45. This request states that the balloon within the VM wants pages for virtual to physical allocation so it can deflate the balloon and release pages. The next step is for the PTG 45 to find a balloon pool for the VM from which to get physical pages. The balloon pool has to expand to get more pages for the VM. The PTG 45 may include first logic 45*a* to find a closest viable balloon. The PTG 45 may further include second logic 45*b* configured to facilitate transmit/receive for inflate/deflate requests/interrupts, allocation acknowledgement, and table updates. In one example implementation, the PTG 45 may utilize the first logic 45*a* to reference a 'Tenant memory allocation table' and a 'Node to Tier Distance table' to determine where the pool balloons are located for that tenant. Table 1 shows an example tenant memory allocation table. Table 2 shows an example node to tier distance table.

TABLE 1

| Tenant | Tier location | Unique Balloon ID | Balloon Address |
|---|---|---|---|
| Tenant 1 | Tier 1 | Balloon 1 | Addr 1 |
|  | Tier 2 | Balloon 2 | Addr 2 |
|  | Tier 1 | Balloon 3 | Addr 3 |
| Tenant 3 | Tier 5 | Balloon 4 | Addr 4 |
|  | Tier 1 | Balloon 5 | Addr 5 |

TABLE 2

| | Distance | | | |
|---|---|---|---|---|
| Node | Tier 1 | Tier 2 | Tier 3 | Tier X |
| Node 1 | 1 distance | 2 distance | 4 distance | N distance |
| Node 2 | 1 distance | 3 distance | 7 distance | N distance |
| Node Y | A distance | B distance | C distance | D distance |

By referencing the two tables, the PTG 45 may determine that: 1) no pool balloon is allocated; 2) pool balloons are present; or 3) pool balloons are present but there is no scope for the pool balloon to expand.

In the first scenario, if there are no pool balloons for that tenant, the PTG 45 may allocate a new balloon according to the tenant's quality of service (e.g., as shown in Table 3 below). In example Table 3, tiers with lower latency to access memory are more expensive for the service.

TABLE 3

| Memory Pool Tier | Cost |
|---|---|
| Tier 1 | $$$ |
| Tier 2 | $$ |
| Tier 3 | $ |

After a new balloon is allocated in the pooled memory, the pages in the pool balloon are given to the VM's balloon. For example, the tables within the PTG 45 may be updated by the second logic 45*b*. The VM's balloon then deflates and the VM gets the pages.

In the second scenario, if there are pool balloons associated with the Tenant, then the balloons and the distance to the respective tier are sent to the first logic 45*a*. The first logic 45*a* may compare the different locations, and pick the closest balloon. After a balloon is picked, the pool balloon ID may be sent to a 'Pool balloon page table' to get the start and stop address pages of the balloon. Table 4 shows an example pool balloon page table. Using this information, the second logic 45*b* may communicate with the pooled memory to expand the pool balloon. Upon the pool balloon's expansion, the page address is sent back to the PTG 45, the tables are updated by the second logic 45*b*, and the free pages are sent to the VM's balloon.

TABLE 4

| Balloon ID | Start Address | Last Page Address |
|---|---|---|
| Balloon 1 | Addr 1 | Addr X |
| Balloon 2 | Addr 2 | Addr Y |
| . . . | . . . | . . . |
| Balloon N | Addr N | Addr Z |

In the third scenario, if there is no scope for the closest pool balloon to expand, the PTG 45 may take a number of different approaches. In one example approach, the PTG 45 may pick the next closest balloon, while maintaining the SLA using a 'SLA to memory location table'. Table 5 shows and example SLA to memory location table.

TABLE 5

| Application SLA | Memory Allocation |
|---|---|
| 100 ms | Tier 0 Local memory |
| 200 ms | Tier 1 Pooled memory |
| 400 ms | Tier 2 Pooled memory |

If the SLA is not met, another approach includes the PTG 45 sending a signal to all the other VMs of the tenant to provide/return pool memory pages that are not used by the VM. The nodes of the tenants may be identified with the help of a 'Tenant to node map table' accessible to the PTG 45. Table 6 shows an example tenant to node map table.

TABLE 6

| Tenant | Node name | Node IP Address | Memory Pool Tier |
|---|---|---|---|
| Tenant 1 | node_a | 0.0.0.0 | Tier 1 |
|  | node_b | 0.0.0.1 | Tier 5 |
| Tenant 3 | node_c | 0.0.0.15 | Tier 3 |

To maintain SLA, the PTG 45 may send the request signal to nodes in the same memory pool tier. The request signal from the PTG 45 may be received by the OS and sent to the Hypervisor as a 'baremetal OS requires memory request'. This causes the hypervisor to request the VM balloons to expand, capture the free pages in the VM, and swap the pages out. The second logic 45b then updates the tables and sends the signal to the pooled memory balloon specifying the pages available. The memory pool balloon may then readjust itself and provide the available pages for the VM's request. If the foregoing examples approaches do not work, then the PTG 45 may send a signal to the VM indicating that the request could not be serviced.

In an example second case, with reference to FIG. 5, a host OS/baremetal OS may need more memory. In this case, the VM's balloon may expand, consuming free pages, all the pages from the pooled memory may be swapped back and only pages from local memory are then returned to the baremetal OS and, if not utilized, paged out to disk.

Figure 6:
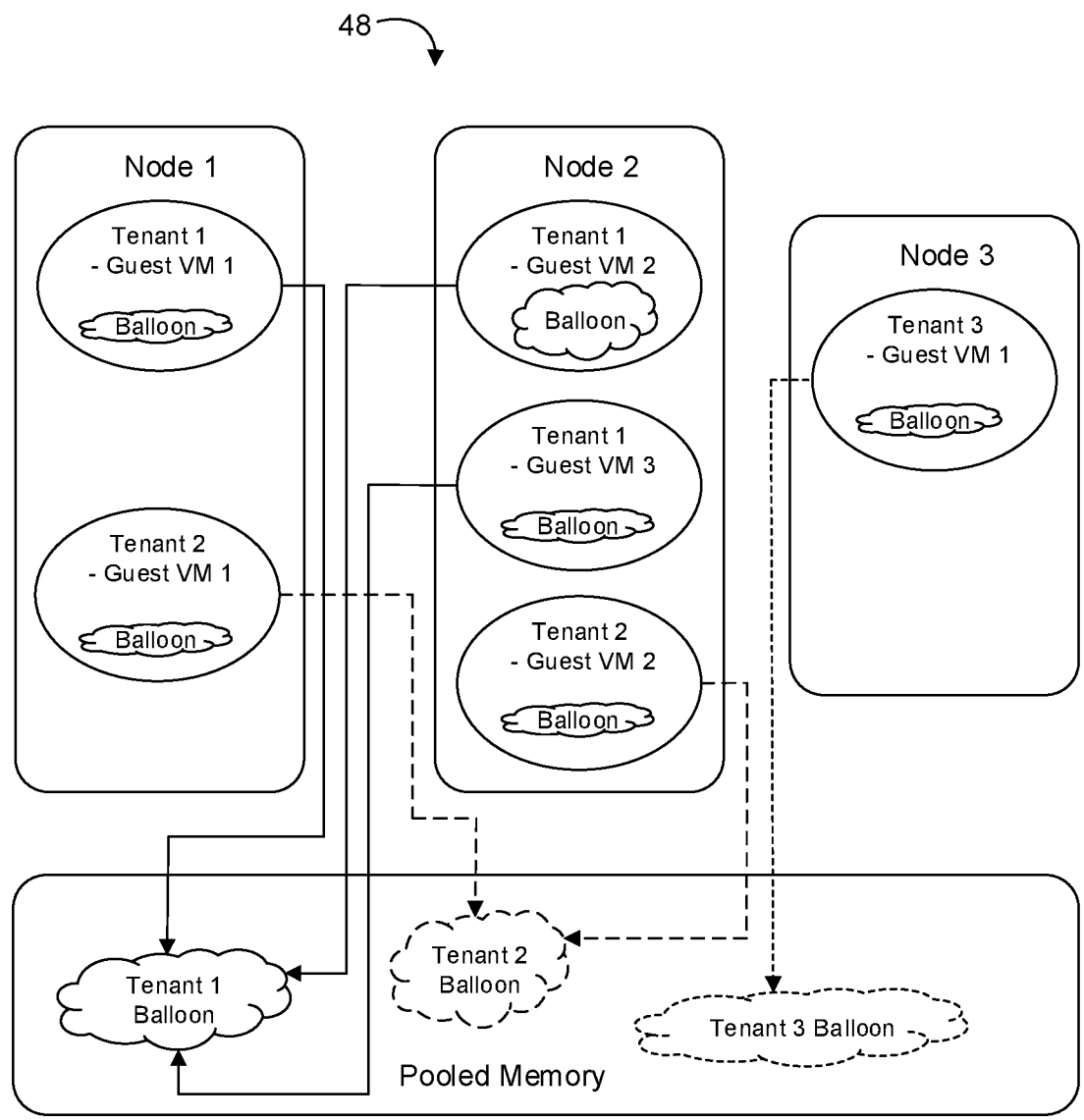
FIG. 6 is a block diagram of another example of a distributed compute environment according to an embodiment.
Figure 7A:
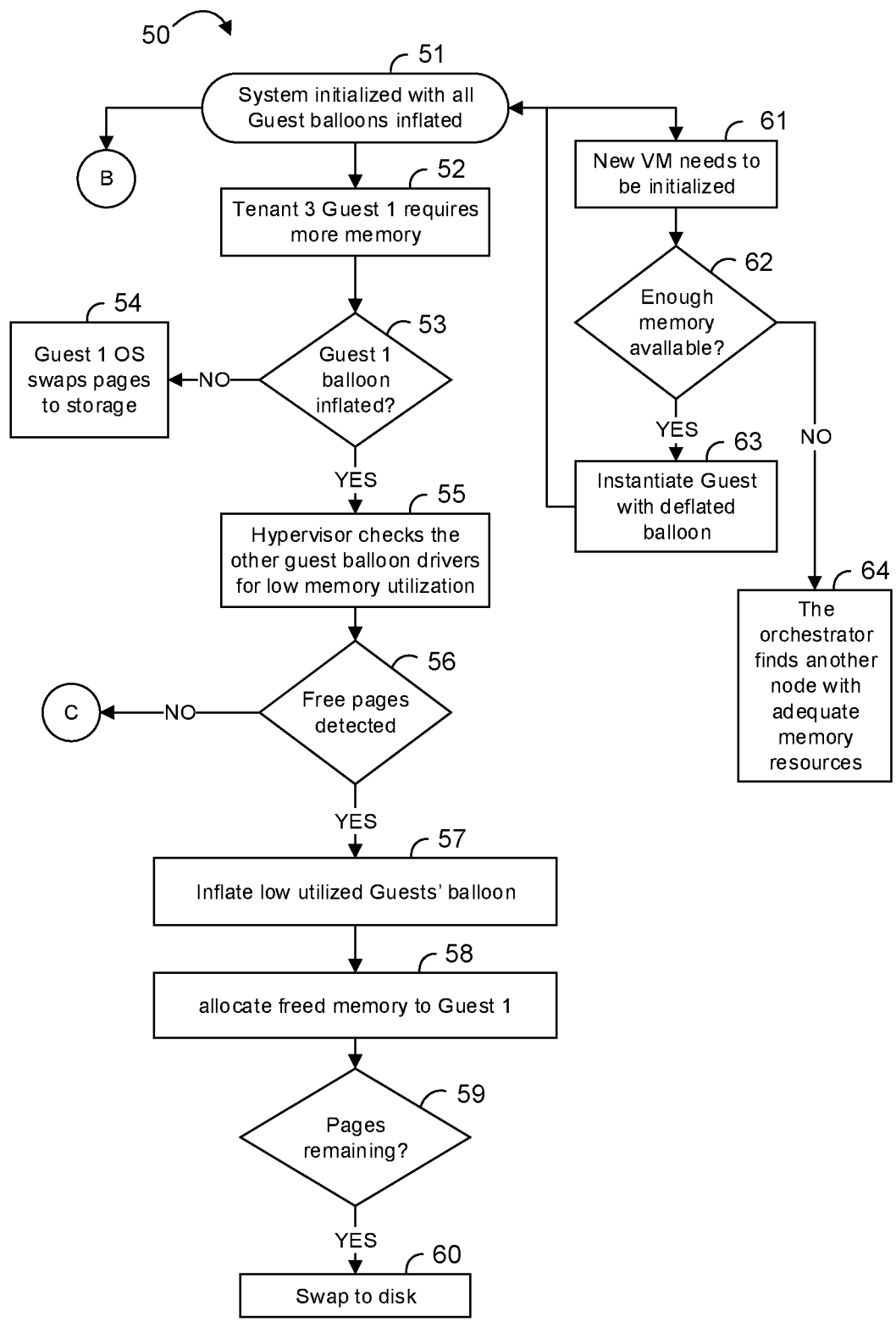
FIGS. 7A to 7E are flowcharts of another example of a method of managing memory according to an embodiment.
Figure 7B:
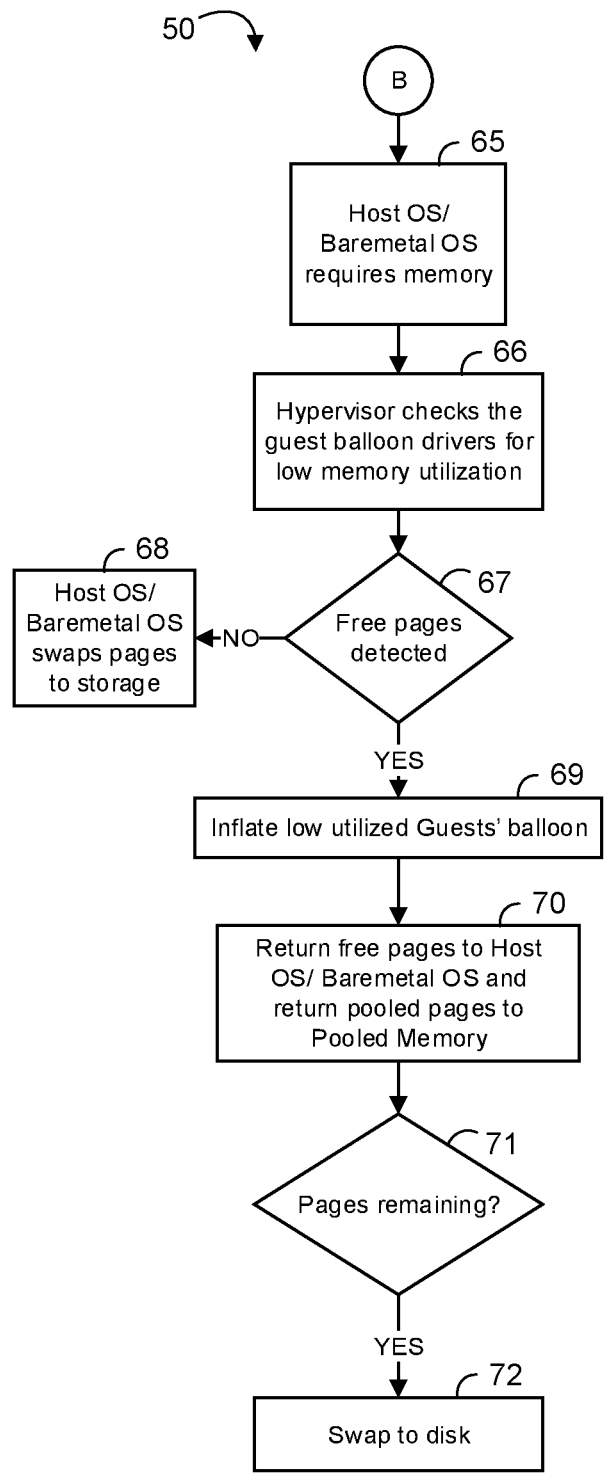
Figure 7C:
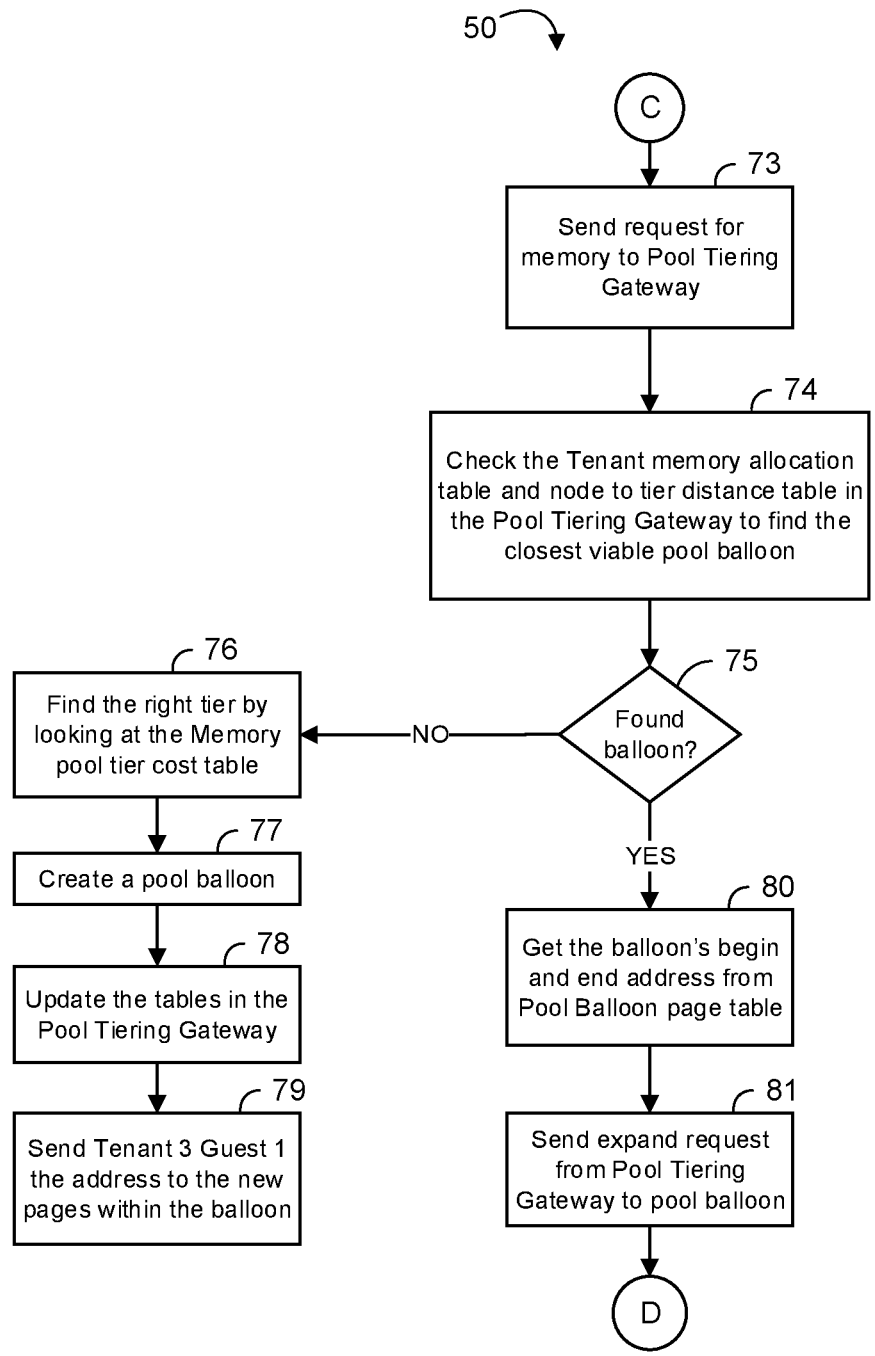
Figure 7D:
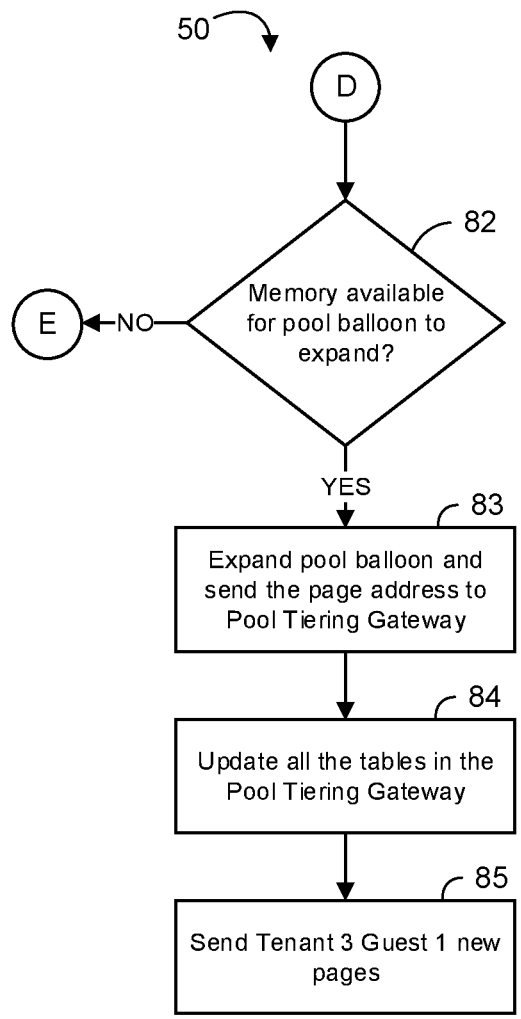
Figure 7E:
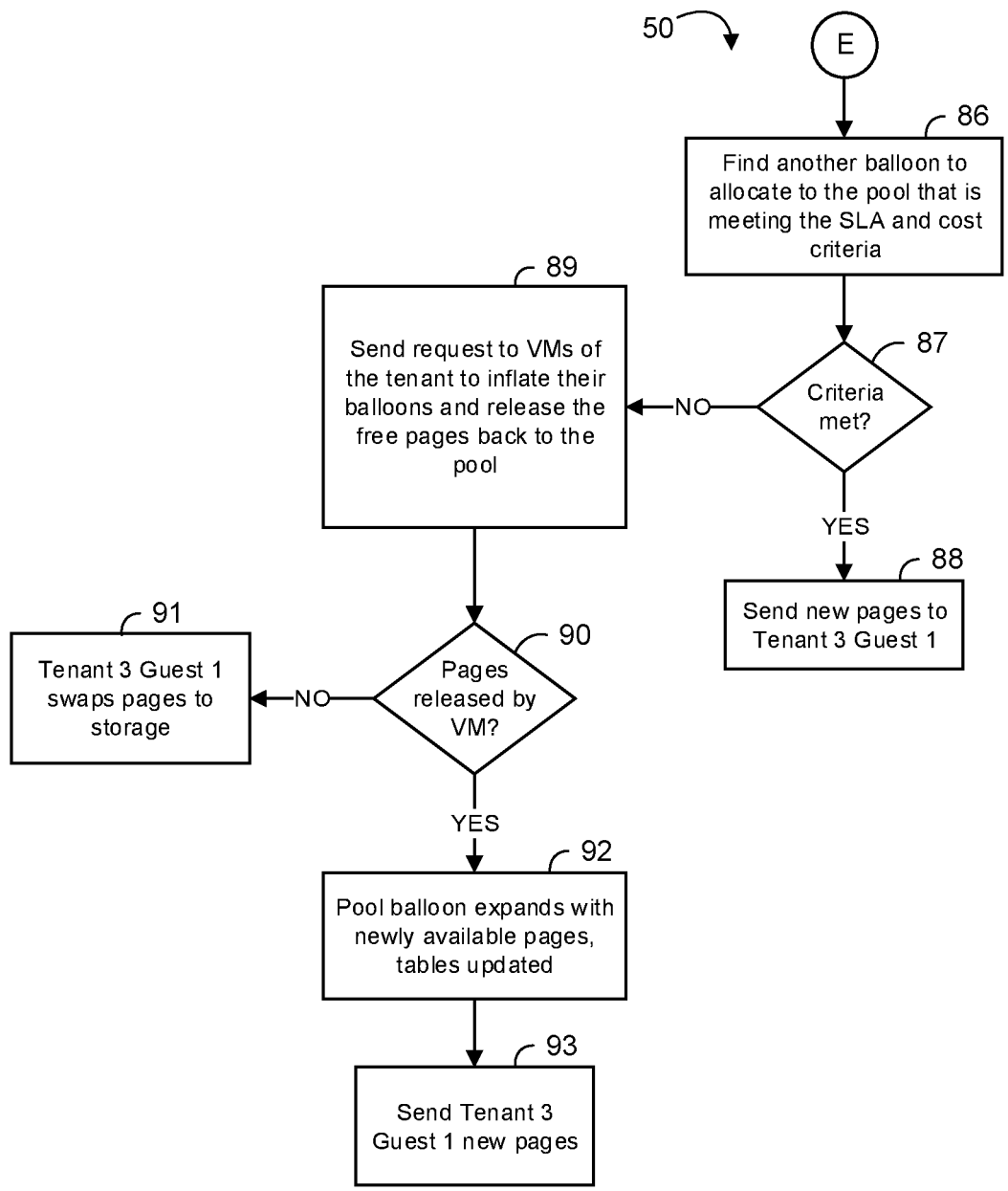

FIG. 6 shows an embodiment of a distributed compute environment 48 with illustrated example flow arrows for pooled memory access. The environment 48 includes multiple compute nodes that share a pooled memory. The pooled memory includes respective memory balloons allocated to respective tenants. FIG. 6 shows how, after memory is allocated by a PTG to the VMs from pooled memory, the VMs access the memory directly and don't have to go through the PTG.

Cross Tenant Pooled Balloon Management Examples

Some embodiments may additionally, or alternatively, include improved or optimized technology to address a problem with pooled memory stranding. The above-described tenant conscious ballooning technology advantageously overcomes one or more problems including tenant memory stranding. But there may still be a problem involving other memory stranding in memory pools. For example, improved or optimized memory utilization within a pool balloon may still leave room for memory stranding within a pooled memory as a whole. Advantageously, some embodiments may provide technology for another level of orchestration across tenants. The additional orchestration allows the PTG to request other tenants to release pages if the VM's tenant cannot release any pages.

In response to the cross tenant request from a first tenant, a second tenant may release pages to the pooled memory. The second tenant's pool balloon deflates, releasing these pages back to the pool. The pool balloon of the first tenant's VM then inflates, pulling in the released pages. Finally, the pages released from the second tenant are given to the VM of the first tenant. Those skilled in the art will appreciate that the foregoing is just one example of cross tenant orchestration. Given the benefit of the present application, numerous other examples will occur to those skilled in the art.

With reference to FIGS. 7A to 7E, an embodiment of a method 50 of managing memory may include initializing a system initialized with all Guest balloons inflated at block 51 (e.g., or partially inflated). When Tenant 3 Guest 1 needs more memory at block 52, the method 50 may include determining if Guest 1's balloon is inflated at block 53 and, if not, the Guest 1 OS swapping pages to storage at block 54. If Guest 1's balloon is determined to be inflated at block 53, the method 50 may proceed to the hypervisor checking the other guest balloon drivers for low memory utilization at block 55. If free pages are detected at block 56, the method 50 may proceed to inflating the low utilized Guests' balloon at block 57 and allocating the freed memory to Guest 1 at block 58. If pages are remaining at block 59, the method 50 may include swapping to disk at block 60.

When a new VM needs to be initialized at block 61, the method 50 may include determining if enough memory is available at block 62 and, if so, instantiating the Guest with a deflated balloon at block 63 (e.g., at least partially deflated). If there is not enough memory available at block 62, the method 50 may include the orchestrator finding another node with adequate memory resources at block 64.

When the host OS/baremetal OS requires more memory at block 65, the method 50 may include the hypervisor checking the guest balloon drivers for low memory utilization at block 66. If free pages are not detected at block 67, the method 50 may proceed to the host OS/baremetal OS swapping pages to storage at block 68. If free pages are detected at block 67, the method 50 may proceed to inflating the low utilized Guests' balloon at block 69 and returning free pages to the host OS/baremetal OS and returning pooled pages to pooled memory at block 70. If pages are remaining at block 71, the method 50 may proceed to swapping to disk at block 72.

If free pages are not detected at block 56, the method 50 may include sending a request for memory to a PTG at block 73 and checking the tenant memory allocation table and node to tier distance table in the PTG to find the closest viable pool balloon at block 74. If a balloon is not found at block 75, the method 50 may proceed to finding the right tier by looking at the memory pool tier cost table at block 76, creating a pool balloon at block 77, updating the tables in the PTG at block 78, and sending Tenant 3 Guest 1 the address to the new pages within the balloon at block 79. If a balloon is found at block 75, the method 50 may proceed to getting the balloon's begin and end address from the Pool balloon page table at block 80, sending an expand request from the PTG to the pool balloon at block 81, and determining if memory is available for the pool balloon to expand at block 82.

If memory is determined to be available for the pool balloon to expand at block 82, the method 50 may proceed to expanding the pool balloon and sending the page address to the PTG at block 83, updating all the tables in the PTG at block 84, and sending Tenant 3 Guest 1 new pages at block 85. If memory is determined to not be available for the pool balloon to expand at block 82, the method 50 may proceed to finding another balloon to allocate to the pool that is meeting the SLA and cost criteria at block 86. If the criteria are met at block 87, the method 50 may proceed to sending new pages to Tenant 3 Guest 1 at block 88.

If the criteria are not met at block 87, the method 50 may proceed to sending requests to VMs of the tenant to inflate their balloons and release the free pages back to the pool at block 89. If pages are not released by a VM at block 90, the method 50 may include Tenant 3 Guest 1 swapping pages to storage at block 91. If pages are released by a VM at block 90, the method 50 may include expanding the pool balloon with the newly available pages and updating the tables at block 92, and sending Tenant 3 Guest 1 new pages at block 93.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
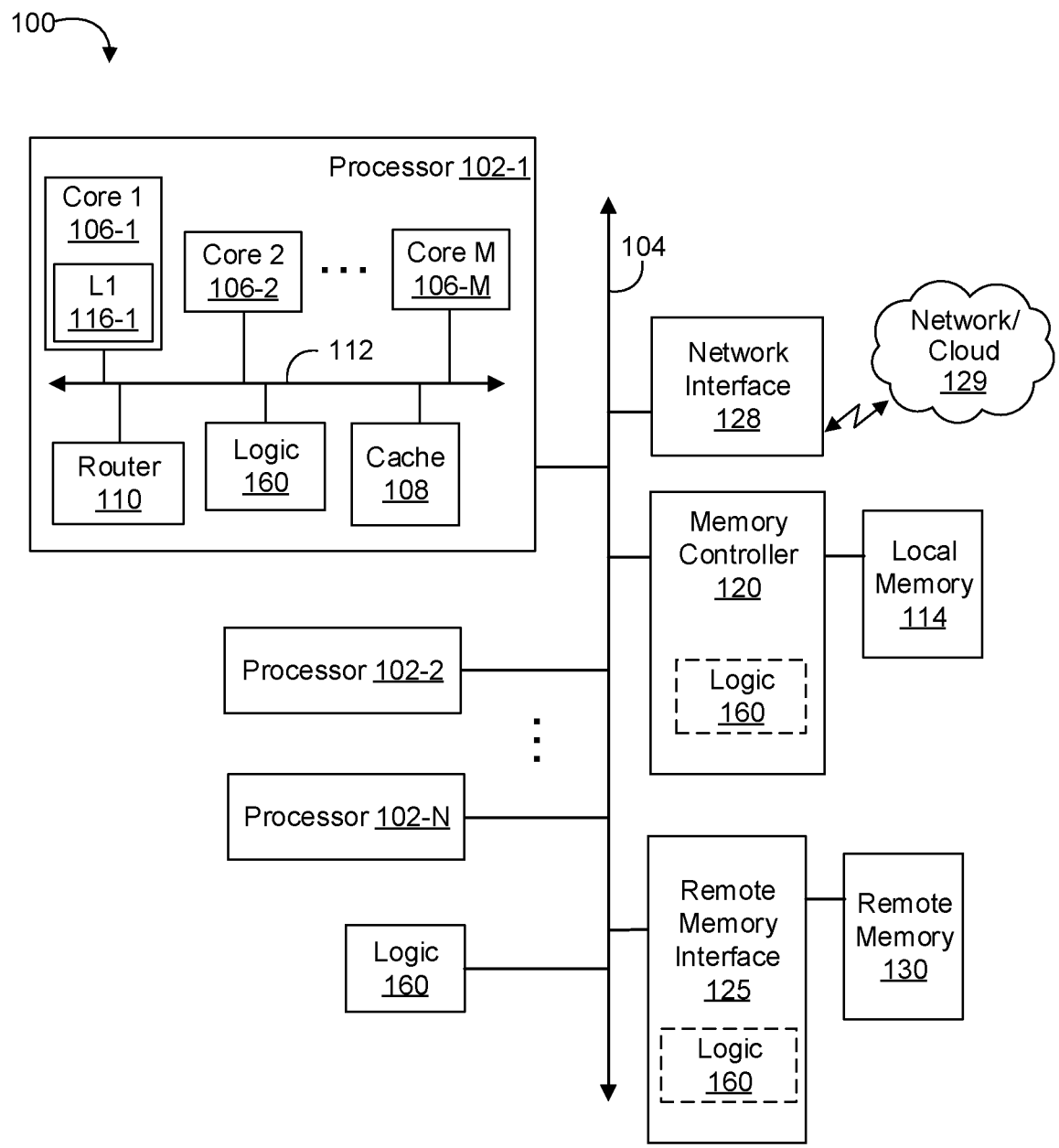
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 160, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a local memory 114 for faster access by the components of the processor 102. As shown in FIG. 8, the local memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, the local memory 114 may be coupled to other components of system 100 through a memory controller 120. The local memory 114 may include volatile memory and may be interchangeably referred to as main memory or system memory. Even though the memory controller 120 is shown to be coupled between the interconnection 104 and the local memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include remote memory 130 coupled to the interconnect 104 via a remote memory interface 125. Hence, the remote memory interface 125 may control access by various components of system 100 to the remote memory 130. Furthermore, even though the remote memory interface 125 is shown to be directly coupled to the interconnection 104 in FIG. 8, the remote memory interface 125 can alternatively communicate via a memory bus interface (e.g., DDR4), a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the memory or storage bus is coupled to interconnect 104 via some other logic like a bus bridge, chipset, etc.) Additionally, the remote memory interface 125 may be incorporated into memory controller logic or provided on a same integrated circuit (IC) device in various embodiments (e.g., on the same circuit board device as the remote memory 130 or in the same enclosure as the remote memory 130).

Furthermore, the remote memory interface 125 and/or the remote memory 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, the remote memory 130, memory/storage bus, SATA bus, the remote memory interface 125, logic 160, etc., to sense variations in various factors affecting power/thermal behavior of the system/platform, such as temperature, operating frequency, operating voltage, power consumption, and/or inter-core communication activity, etc.

As illustrated in FIG. 8, the remote memory interface 125 may include logic 160, which may be in the same enclosure as the remote memory 130 and/or fully integrated on a printed circuit board (PCB) of the remote memory 130. The system 100 may include further logic 160 outside of the remote memory 130. One or more of the features/aspects/operations discussed with reference to FIGS. 1-7E may be performed by one or more of the components of FIG. 8. Also, one or more of the features/aspects/operations of FIGS. 1-7E may be programmed into firmware. Further, the memory controller 120 may also include logic 160. Advantageously, the logic 160 may include technology to implement one or more aspects of the system 10 (FIG. 1), the apparatus 15 (FIG. 2), the method 20 (FIGS. 3A to 3C), the virtualization environment 35 (FIG. 4), the distributed compute environment 40 (FIG. 5), the distributed compute environment 48 (FIG. 6), the method 50 (FIGS. 7A to 7E), and/or any of the features discussed herein.

In particular, a combination of the local memory 114 and the remote memory 130 (e.g., where the remote memory 130 is shared between multiple compute nodes) may be configured as a pooled memory. The logic 160 may be configured to provide an interface to the pooled memory, allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory. In some embodiments, the logic 160 may be further configured to provide memory affinity for two or more applications associated with a particular tenant of the respective tenants. For example, the logic 160 may be configured to share a particular memory balloon of the respective memory balloons associated with a particular tenant of the respective tenants among two or more applications associated with the particular tenant.

In some embodiments, the logic 160 may be configured to manage the respective memory balloons based on a first table that indicates a tenant memory allocation and a second table that indicates a node to tier distance. Additionally, or alternatively, the logic 160 may be configured to determine if a first memory balloon of the respective memory balloons associated with a first tenant of the respective tenants has no free pages, and, if so determined, request free pages from a second balloon of the respective memory balloons associated with a second tenant of the respective tenants. In some embodiments, the logic 160 may be further configured to allocate a particular memory balloon of the respective memory balloons associated with a particular tenant of the respective tenants to a particular memory tier of the two or more memory tiers based on a performance characteristic associated with the particular tenant. For example, the performance characteristic may correspond to one or more of a SLA characteristic, a SLO characteristic, and a QoS characteristic. As shown in FIG. 8, features or aspects of the logic 160 may be distributed throughout the system 100, and/or co-located/integrated with various components of the system 100.

Additional Notes and Examples

Example 1 includes an electronic apparatus, comprising one or more substrates; and logic coupled to the one or more substrates, the logic to provide an interface to a pooled memory that is configured as a combination of local memory and remote memory, wherein the remote memory is shared between multiple compute nodes, allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory.

Example 2 includes the apparatus of Example 1, wherein the logic is further to provide memory affinity for two or more applications associated with a particular tenant of the respective tenants.

Example 3 includes the apparatus of any of Examples 1 to 2, wherein the logic is further to share a particular memory balloon of the respective memory balloons associated with a particular tenant of the respective tenants among two or more applications associated with the particular tenant.

Example 4 includes the apparatus of any of Examples 1 to 3, wherein the logic is further to manage the respective memory balloons based on a first table that indicates a tenant memory allocation and a second table that indicates a node to tier distance.

Example 5 includes the apparatus of any of Examples 1 to 4, wherein the logic is further to determine if a first memory balloon of the respective memory balloons associated with a first tenant of the respective tenants has no free pages; and, if so determined, request free pages from a second balloon of the respective memory balloons associated with a second tenant of the respective tenants.

Example 6 includes the apparatus of any of Examples 1 to 5, wherein the logic is further to allocate a particular memory balloon of the respective memory balloons associated with a particular tenant of the respective tenants to a particular memory tier of the two or more memory tiers based on a performance characteristic associated with the particular tenant.

Example 7 includes the apparatus of Example 6, wherein the performance characteristic corresponds to one or more of a service level agreement characteristic, a service level objective characteristic, and a quality of service characteristic.

Example 8 includes an electronic system, comprising pooled memory configured as a combination of local memory and remote memory, wherein the remote memory is shared between multiple compute nodes; and logic communicatively coupled to the pooled memory, the logic to provide an interface to the pooled memory, allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory.

Example 9 includes the system of Example 8, wherein the logic is further to provide memory affinity for two or more applications associated with a particular tenant of the respective tenants.

Example 10 includes the system of any of Examples 8 to 9, wherein the logic is further to share a particular memory balloon of the respective memory balloons associated with a particular tenant of the respective tenants among two or more applications associated with the particular tenant.

Example 11 includes the system of any of Examples 8 to 10, wherein the logic is further to manage the respective memory balloons based on a first table that indicates a tenant memory allocation and a second table that indicates a node to tier distance.

Example 12 includes the system of any of Examples 8 to 11, wherein the logic is further to determine if a first memory balloon of the respective memory balloons associated with a first tenant of the respective tenants has no free pages; and, if so determined, request free pages from a second balloon of the respective memory balloons associated with a second tenant of the respective tenants.

Example 13 includes the system of any of Examples 8 to 12, wherein the logic is further to allocate a particular memory balloon of the respective memory balloons associated with a particular tenant of the respective tenants to a particular memory tier of the two or more memory tiers based on a performance characteristic associated with the particular tenant.

Example 14 includes the system of Example 13, wherein the performance characteristic corresponds to one or more of a service level agreement characteristic, a service level objective characteristic, and a quality of service characteristic.

Example 15 includes a method of managing memory, comprising providing an interface to a pooled memory that is configured as a combination of local memory and remote memory, wherein the remote memory is shared between multiple compute nodes, allocating respective memory portions of the pooled memory to respective tenants, associating respective memory balloons with the respective tenants that correspond to the allocated respective memory portions; and managing the respective memory balloons based on the respective tenants and two or more memory tiers associated with the pooled memory.

Example 16 includes the method of Example 15, further comprising providing memory affinity for two or more applications associated with a particular tenant of the respective tenants.

Example 17 includes the method of any of Examples 15 to 16, further comprising sharing a particular memory balloon of the respective memory balloons associated with a particular tenant of the respective tenants among two or more applications associated with the particular tenant.

Example 18 includes the method of any of Examples 15 to 17, further comprising managing the respective memory balloons based on a first table that indicates a tenant memory allocation and a second table that indicates a node to tier distance.

Example 19 includes the method of any of Examples 15 to 18, further comprising determining if a first memory balloon of the respective memory balloons associated with a first tenant of the respective tenants has no free pages; and, if so determined, requesting free pages from a second balloon of the respective memory balloons associated with a second tenant of the respective tenants.

Example 20 includes the method of any of Examples 15 to 19, further comprising allocating a particular memory balloon of the respective memory balloons associated with a particular tenant of the respective tenants to a particular memory tier of the two or more memory tiers based on a performance characteristic associated with the particular tenant.

Example 21 includes the method of Example 20, wherein the performance characteristic corresponds to one or more of a service level agreement characteristic, a service level objective characteristic, and a quality of service characteristic.

Example 22 includes at least one non-transitory one machine readable medium comprising a plurality of instructions that, in response to being executed on a computing device, cause the computing device to provide an interface to a pooled memory that is configured as a combination of local memory and remote memory, wherein the remote memory is shared between multiple compute nodes, allocate respective memory portions of the pooled memory to respective tenants, associate respective memory balloons with the respective tenants that correspond to the allocated respective memory portions, and manage the respective memory balloons based on the respective tenants and two or more memory tiers associated with the pooled memory.

Example 23 includes the at least one non-transitory one machine readable medium of Example 22, comprising a plurality of further instructions that, in response to being executed on the computing device, cause the computing device to provide memory affinity for two or more applications associated with a particular tenant of the respective tenants.

Example 24 includes the at least one non-transitory one machine readable medium of any of Examples 22 to 23, wherein the first application corresponds to a virtual machine, comprising a plurality of further instructions that, in response to being executed on the computing device, cause the computing device to share a particular memory balloon of the respective memory balloons associated with a particular tenant of the respective tenants among two or more applications associated with the particular tenant.

Example 25 includes the at least one non-transitory one machine readable medium of any of Examples 22 to 24, comprising a plurality of further instructions that, in response to being executed on the computing device, cause the computing device to manage the respective memory balloons based on a first table that indicates a tenant memory allocation and a second table that indicates a node to tier distance.

Example 26 includes the at least one non-transitory one machine readable medium of any of Examples 22 to 25, comprising a plurality of further instructions that, in response to being executed on the computing device, cause the computing device to determine if a first memory balloon of the respective memory balloons associated with a first tenant of the respective tenants has no free pages; and, if so determined, request free pages from a second balloon of the respective memory balloons associated with a second tenant of the respective tenants.

Example 27 includes the at least one non-transitory one machine readable medium of any of Examples 22 to 26, comprising a plurality of further instructions that, in response to being executed on the computing device, cause the computing device to allocate a particular memory balloon of the respective memory balloons associated with a particular tenant of the respective tenants to a particular memory tier of the two or more memory tiers based on a performance characteristic associated with the particular tenant.

Example 28 includes the at least one non-transitory one machine readable medium of Example 27, wherein the performance characteristic corresponds to one or more of a service level agreement characteristic, a service level objective characteristic, and a quality of service characteristic.

Example 29 includes a pool tiering gateway apparatus, comprising means for providing an interface to a pooled memory that is configured as a combination of local memory and remote memory, wherein the remote memory is shared between multiple compute nodes, means for allocating respective memory portions of the pooled memory to respective tenants, means for associating respective memory balloons with the respective tenants that correspond to the allocated respective memory portions; and means for managing the respective memory balloons based on the respective tenants and two or more memory tiers associated with the pooled memory.

Example 30 includes the apparatus of Example 29, further comprising means for providing memory affinity for two or more applications associated with a particular tenant of the respective tenants.

Example 31 includes the apparatus of any of Examples 29 to 30, further comprising means for sharing a particular memory balloon of the respective memory balloons associated with a particular tenant of the respective tenants among two or more applications associated with the particular tenant.

Example 32 includes the apparatus of any of Examples 29 to 31, further comprising means for managing the respective memory balloons based on a first table that indicates a tenant memory allocation and a second table that indicates a node to tier distance.

Example 33 includes the apparatus of any of Examples 29 to 32, further comprising means for determining if a first memory balloon of the respective memory balloons associated with a first tenant of the respective tenants has no free pages; and, if so determined, means for requesting free pages from a second balloon of the respective memory balloons associated with a second tenant of the respective tenants.

Example 34 includes the apparatus of any of Examples 29 to 33, further comprising means for allocating a particular memory balloon of the respective memory balloons associated with a particular tenant of the respective tenants to a particular memory tier of the two or more memory tiers based on a performance characteristic associated with the particular tenant.

Example 35 includes the apparatus of Example 34, wherein the performance characteristic corresponds to one or more of a service level agreement characteristic, a service level objective characteristic, and a quality of service characteristic.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
logic coupled to the one or more substrates, the logic to:
provide an interface to a pooled memory that is configured as a combination of local memory and remote memory, wherein the remote memory is shared between multiple compute nodes,
allocate respective memory portions of the pooled memory to respective tenants,
associate respective memory balloons with the respective tenants that correspond to the allocated respective memory portions,
manage the respective memory balloons based on the respective tenants and two or more memory tiers associated with the pooled memory, and
manage the respective memory balloons based on a first table that indicates a tenant memory allocation and a second table that indicates a node to tier distance.

2. The apparatus of claim 1, wherein the logic is further to:
provide memory affinity for two or more applications associated with a particular tenant of the respective tenants.

3. The apparatus of claim 1, wherein the logic is further to:
share a particular memory balloon of the respective memory balloons associated with a particular tenant of the respective tenants among two or more applications associated with the particular tenant.

4. The apparatus of claim 1, wherein the logic is further to:
determine if a first memory balloon of the respective memory balloons associated with a first tenant of the respective tenants has no free pages; and, if so determined,
request free pages from a second balloon of the respective memory balloons associated with a second tenant of the respective tenants.

5. The apparatus of claim 1, wherein the logic is further to:
allocate a particular memory balloon of the respective memory balloons associated with a particular tenant of the respective tenants to a particular memory tier of the two or more memory tiers based on a performance characteristic associated with the particular tenant.

6. The apparatus of claim 5, wherein the performance characteristic corresponds to one or more of a service level agreement characteristic, a service level objective characteristic, and a quality of service characteristic.

7. An electronic system, comprising:
pooled memory configured as a combination of local memory and remote memory, wherein the remote memory is shared between multiple compute nodes; and
logic communicatively coupled to the pooled memory, the logic to:
provide an interface to the pooled memory,
allocate respective memory portions of the pooled memory to respective tenants,
associate respective memory balloons with the respective tenants that correspond to the allocated respective memory portions,
manage the respective memory balloons based on the respective tenants and two or more memory tiers associated with the pooled memory, and
allocate a particular memory balloon of the respective memory balloons associated with a particular tenant of the respective tenants to a particular memory tier of the two or more memory tiers based on a performance characteristic associated with the particular tenant.

8. The system of claim 7, wherein the logic is further to:
provide memory affinity for two or more applications associated with a particular tenant of the respective tenants.

9. The system of claim 7, wherein the logic is further to:
share a particular memory balloon of the respective memory balloons associated with a particular tenant of the respective tenants among two or more applications associated with the particular tenant.

10. The system of claim 7, wherein the logic is further to:
manage the respective memory balloons based on a first table that indicates a tenant memory allocation and a second table that indicates a node to tier distance.

11. The system of claim 7, wherein the logic is further to:
determine if a first memory balloon of the respective memory balloons associated with a first tenant of the respective tenants has no free pages; and, if so determined,
request free pages from a second balloon of the respective memory balloons associated with a second tenant of the respective tenants.

12. The system of claim 7, wherein the performance characteristic corresponds to one or more of a service level agreement characteristic, a service level objective characteristic, and a quality of service characteristic.

13. A method of managing memory, comprising:
providing an interface to a pooled memory that is configured as a combination of local memory and remote memory, wherein the remote memory is shared between multiple compute nodes;
allocating respective memory portions of the pooled memory to respective tenants;
associating respective memory balloons with the respective tenants that correspond to the allocated respective memory portions;
managing the respective memory balloons based on the respective tenants and two or more memory tiers associated with the pooled memory; and
allocating a particular memory balloon of the respective memory balloons associated with a particular tenant of the respective tenants to a particular memory tier of the two or more memory tiers based on a performance characteristic associated with the particular tenant.

14. The method of claim 13, further comprising:
providing memory affinity for two or more applications associated with a particular tenant of the respective tenants.

15. The method of claim 13, further comprising:
sharing a particular memory balloon of the respective memory balloons associated with a particular tenant of the respective tenants among two or more applications associated with the particular tenant.

16. The method of claim 13, further comprising:
managing the respective memory balloons based on a first table that indicates a tenant memory allocation and a second table that indicates a node to tier distance.

17. The method of claim 13, further comprising:
determining if a first memory balloon of the respective memory balloons associated with a first tenant of the respective tenants has no free pages; and, if so determined, requesting free pages from a second balloon of the respective memory balloons associated with a second tenant of the respective tenants.

18. The method of claim 13,
wherein the performance characteristic corresponds to one or more of a service level agreement characteristic, a service level objective characteristic, and a quality of service characteristic.

\* \* \* \* \*